(12) United States Patent
Wilson et al.

(10) Patent No.: US 8,807,275 B2
(45) Date of Patent: Aug. 19, 2014

(54) SOUND ABSORBENT BARRIER

(75) Inventors: Peter Wilson, Berkshire (GB); Andrew Murphy, Surrey (GB)

(73) Assignee: Echo Barrier Limited (GB)

( * ) Notice: Subject to any disclaimer, the term of this patent is extended or adjusted under 35 U.S.C. 154(b) by 0 days.

(21) Appl. No.: 13/819,837

(22) PCT Filed: Sep. 1, 2011

(86) PCT No.: PCT/GB2011/001287
§ 371 (c)(1),
(2), (4) Date: Feb. 28, 2013

(87) PCT Pub. No.: WO2012/028850
PCT Pub. Date: Mar. 8, 2012

(65) Prior Publication Data
US 2013/0161126 A1  Jun. 27, 2013

(30) Foreign Application Priority Data
Sep. 1, 2010 (GB) .................................. 1014559.7

(51) Int. Cl.
*E04B 1/84* (2006.01)
*E04B 1/82* (2006.01)
*E04G 21/24* (2006.01)
*E04G 21/32* (2006.01)
*E01F 8/00* (2006.01)

(52) U.S. Cl.
CPC .............. *E04B 1/8409* (2013.01); *E04G 21/24* (2013.01); *E04B 1/84* (2013.01); *E04B 2001/8461* (2013.01); *E04G 21/32* (2013.01); *E01F 8/0088* (2013.01); *E04B 1/82* (2013.01); *B32B 2307/102* (2013.01); *E04B 2001/8452* (2013.01)
USPC ........... 181/290; 181/200; 181/284; 181/286; 181/291; 181/294

(58) Field of Classification Search
CPC ..... E04B 2001/8461; E04B 1/82; E04B 1/84; B32B 2307/102
USPC .................. 181/290, 200, 284, 286, 291, 294
See application file for complete search history.

(56) References Cited

U.S. PATENT DOCUMENTS 2,160,729 A * 5/1939 Graham et al. ................ 442/326
2,217,165 A * 10/1940 Graham et al. ................. 52/411

(Continued)

FOREIGN PATENT DOCUMENTS

DE           8309534 U1     7/1983
DE          19909615 A1     9/2000

(Continued)

OTHER PUBLICATIONS

Custom Audio Designs, "Portable Acoustic Curtains/Drapes/Enclosures," 2003-2008; http://www.customaudiodesigns.co.uk/soundproofing/acoustic_curtains_drapes.htm [accessed Dec. 3, 2010] It is not known if this reference constitutes prior art or not. However, for the purposes of examination only, please consider as prior art.

*Primary Examiner* — David Warren
*Assistant Examiner* — Christina Russell
(74) *Attorney, Agent, or Firm* — Luedeka Neely Group, PC

(57) ABSTRACT

A sound absorbent barrier has a sound absorbent layer disposed between a porous first cover and a second cover. The barrier also has a waterproof sound-permeable membrane between the first cover and the sound absorbent layer. The sound absorbent layer is thus protected from damage by the first and second covers and water ingress is prevented by the sound permeable membrane. The second cover may be non-porous to reflect sound waves which have passed through the sound absorbent layer back through the sound absorbent layer. Alternatively, the second cover may be porous to enable absorption of sound from two directions.

19 Claims, 17 Drawing Sheets

(56) References Cited

U.S. PATENT DOCUMENTS

| | | | |
|---|---|---|---|
| 2,636,543 A * | 4/1953 | Groskopf | 181/284 |
| 2,694,025 A * | 11/1954 | Slayter et al. | 428/102 |
| 3,948,347 A * | 4/1976 | Rutledge | 181/291 |
| 4,188,248 A * | 2/1980 | Millgardh et al. | 156/164 |
| 4,193,474 A * | 3/1980 | Okubo et al. | 181/287 |
| 4,237,178 A * | 12/1980 | Mazaki | 442/228 |
| 4,553,631 A * | 11/1985 | Panza | 181/291 |
| 4,642,951 A * | 2/1987 | Mortimer | 52/145 |
| 4,736,785 A * | 4/1988 | Seuster | 160/264 |
| 4,892,413 A * | 1/1990 | Vats | 366/349 |
| 4,926,963 A * | 5/1990 | Snyder | 181/290 |
| 4,947,958 A * | 8/1990 | Snyder | 181/296 |
| 6,382,350 B1 * | 5/2002 | Jezewski et al. | 181/290 |
| 7,063,184 B1 * | 6/2006 | Johnson | 181/290 |
| 7,357,219 B2 * | 4/2008 | Mafi et al. | 181/202 |
| 7,874,400 B2 * | 1/2011 | Teisseyre | 181/200 |
| 7,992,678 B2 * | 8/2011 | Pilaar | 181/284 |
| 8,469,144 B2 * | 6/2013 | Pilaar | 181/284 |
| 2003/0024637 A1 * | 2/2003 | Min | 156/307.3 |
| 2004/0065501 A1 * | 4/2004 | Tong et al. | 181/200 |
| 2005/0077017 A1 * | 4/2005 | Ramsey | 160/238 |
| 2008/0121461 A1 * | 5/2008 | Gross et al. | 181/286 |
| 2009/0178882 A1 * | 7/2009 | Johnson | 181/286 |

FOREIGN PATENT DOCUMENTS

| | | |
|---|---|---|
| EP | 1408169 A1 | 4/2004 |
| JP | 2125008 A | 5/1990 |
| JP | 2009121032 | 4/2009 |
| WO | 8001184 A1 | 12/1980 |
| WO | 9012168 A1 | 10/1990 |
| WO | 2005113238 A1 | 12/2005 |

* cited by examiner

SOUND ABSORBENT BARRIER

CROSS-REFERENCE TO RELATED APPLICATION

This application claims priority under all applicable statutes, and is a U.S. National phase (37 U.S.C. Section 371) of International Application PCT/GB2011/001287, filed Sep. 1, 2011, and entitled SOUND ABSORBENT BARRIER, which claims priority to GB 1014559.7, filed Sep. 1, 2010, incorporated herein by reference in their entireties.

The present invention relates to a flexible sound absorbent barrier. In particular, the present invention relates to sound absorbent barrier for the acoustic screening of construction sites and the like. The present invention is readily applicable to other uses, for example at music concerts or sporting events.

Typical noise barriers for such applications include a solid mass barrier constructed from a material such as metal, plywood or acrylic glass in order to prevent the transmission of noise. These barriers tend to reflect rather than absorb sound waves. Thus, the overall level of noise is generally not reduced. In fact, noise levels within the enclosure defined by the barrier may be increased by the presence of the barrier.

Alternatively, noise barriers may include a sound absorption material to reduce the overall noise level. Typically, such barriers include rock wool or fibre glass as the sound absorbent. Although effective at sound absorption, precautions must be taken when handling these materials since they can be absorbed into the body by inhalation and can irritate the eyes, skin and respiratory tract. Generally, this type of sound absorption material is encased between two solid layers of material, for example PVC to prevent water ingress and to prevent the escape of the sound absorbent material. However, by encasing the sound absorbent material in solid impermeable materials, the effectiveness of the barrier as a sound absorber is reduced because sound cannot penetrate into the sound absorbent material.

Some acoustic barriers are known which have an unprotected layer of acoustic absorbent material. However, these soak up water from the rain which causes problems with increased weight, leakage of water when the barriers are being transported in vehicles or stored and with the material rotting or going mouldy.

Some rigid barriers are known which include a thin plastic film as a skin over the absorbent material. However, although the film is waterproof it does not pass air and therefore reflects a significant proportion of the sound, reducing the performance of the acoustic absorbent material.

Conventionally, sound absorbent noise barriers are folded flat for storage and transport. Although this reduces the barrier's size to a degree, such barriers are still unwieldy, overly flexible and difficult to manage.

Further, conventional sound absorbent barriers are generally suspended from a supporting structure, for example scaffolding or Heras® fencing, by means of cable ties. Thus, their installation is time-consuming and requires the cooperation of at least two persons. This can be a significant disadvantage, particularly if the barriers are to be installed and removed within a short space of time, for example to screen the sound from railway maintenance carried out overnight.

According to the present invention, there is provided a flexible sound absorbent barrier comprising a sound-absorbent layer disposed between a first porous sound-permeable cover and a second cover and a waterproof sound-permeable textile membrane disposed between the first cover and the sound absorbent layer.

With this configuration, the sound absorbent layer is protected from damage by the first and second covers and water ingress is prevented. Further, the porous first cover and sound-permeable membrane enable sound to penetrate to the sound absorbent layer rather than to be reflected back to the noise source.

Preferably, the second cover is porous and sound-permeable. With this arrangement, both sides of the sound barrier may provide sound absorption.

Alternatively, the second cover is non-porous. Consequently, any sound which passes through the first cover and the sound absorbent layer is reflected back by the second cover so that the sound passes through the sound absorbent layer for a second time. Thus, the sound attenuation provided by the barrier may be improved.

Preferably, a second waterproof sound-permeable textile membrane is disposed between the second cover and the sound absorbent layer. Thus, water ingress to the sound absorbent later through the second cover may be prevented without significantly reducing the sound absorption characteristics of the barrier.

Preferably, the sound absorbent layer comprises an open cell foam.

Preferably, the sound absorbent layer comprises a profiled surface including a plurality of ridges or protrusions.

Preferably, the sound absorbent barrier is sufficiently flexible for it to be rolled-up.

Preferably, the sound absorbent barrier further comprises fastening means to retain the sound absorbent barrier in a rolled-up state.

Thus, the size of the barrier may be reduced and its structural rigidity may be increased when it is not in use. This aids storage and transportation of the barrier. Further, installation of the barrier may be made easier since, once hung from a supporting structure, it will unroll under its own weight when the fastening means is released.

Preferably, the second cover is formed from PVC.

A flexible, non-porous third cover may be provided adjacent to the second cover. The third cover may be formed from PVC.

Preferably, the sound absorbent barrier further comprises a mounting device for hanging the sound absorbent barrier from a supporting structure.

Preferably, the mounting device comprises a hook member.

Preferably, the mounting device further comprises a carrier to which the hook member is slidably connected such that the hook member is slidable relative to the sound absorbent barrier in a direction substantially perpendicular to a plane of the sound absorbent barrier. The mounting device may include a detent means to resist sliding of the hook member and/or to divide the sliding displacement of the hook member into discrete increments.

Preferably, the hook member comprises a first hook for hanging the barrier from a supporting structure and a second hook for hanging the barrier from the hook member.

Preferably, the first and second hook members are different sizes and are arranged such that they may be clipped over differently sized fence posts.

Preferably, the porous inner cover is formed from a flexible plastic material.

Preferably, the waterproof sound-permeable membrane is formed from Gore-Tex® or equivalent material.

A preferred embodiment of the present invention will now be described with reference to the accompanying drawings in which.

It should be noted that the figures are illustrated schematically for simplicity and are not necessarily drawn to scale.

Figure 1:
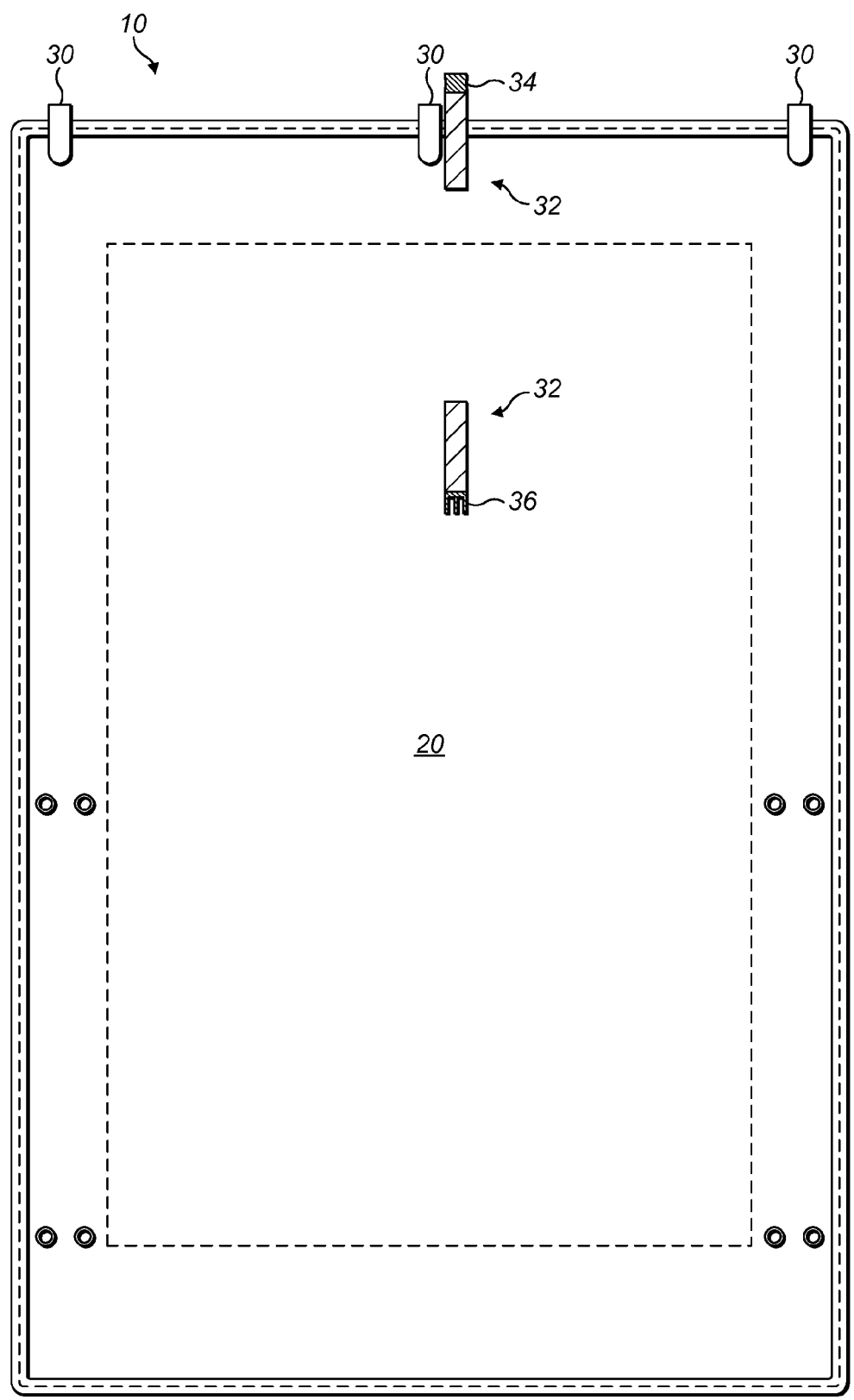
FIG. 1 is a front view of a sound absorbent barrier in accordance with a first embodiment of the present invention.

FIG. 1 shows a sound absorbent barrier 10 of the present invention illustrating the main components of the barrier 10. The barrier 10 has a screen body 20 for absorbing noise and mounting devices 30 for mounting the barrier 10 onto a supporting structure (not shown), such as fencing or scaffolding. The barrier 10 also includes fastening means 32 for securing the barrier in a rolled-up state when it is not in use.

In this example, the fastening means 32 comprises a two-piece plastic clip with a female part 34 attached to a strap at one end of the barrier 10 and a male part 36 attached to an adjustable strap which is fixed to the barrier 10 towards the opposite end of the barrier 10. Other fastening means are possible, for example a hook and loop fastener, or a buckle, etc. The straps of the fastening means 32 may also act as a handle for carrying the barrier when it is rolled-up. With this arrangement, the barrier 10 can be kept securely rolled-up when not in use, thus reducing the space required for storage and improving the ease of handling. This is of particular use when the barrier 10 is to be mounted to a structure to which access is limited, such as scaffolding.

Figure 2:
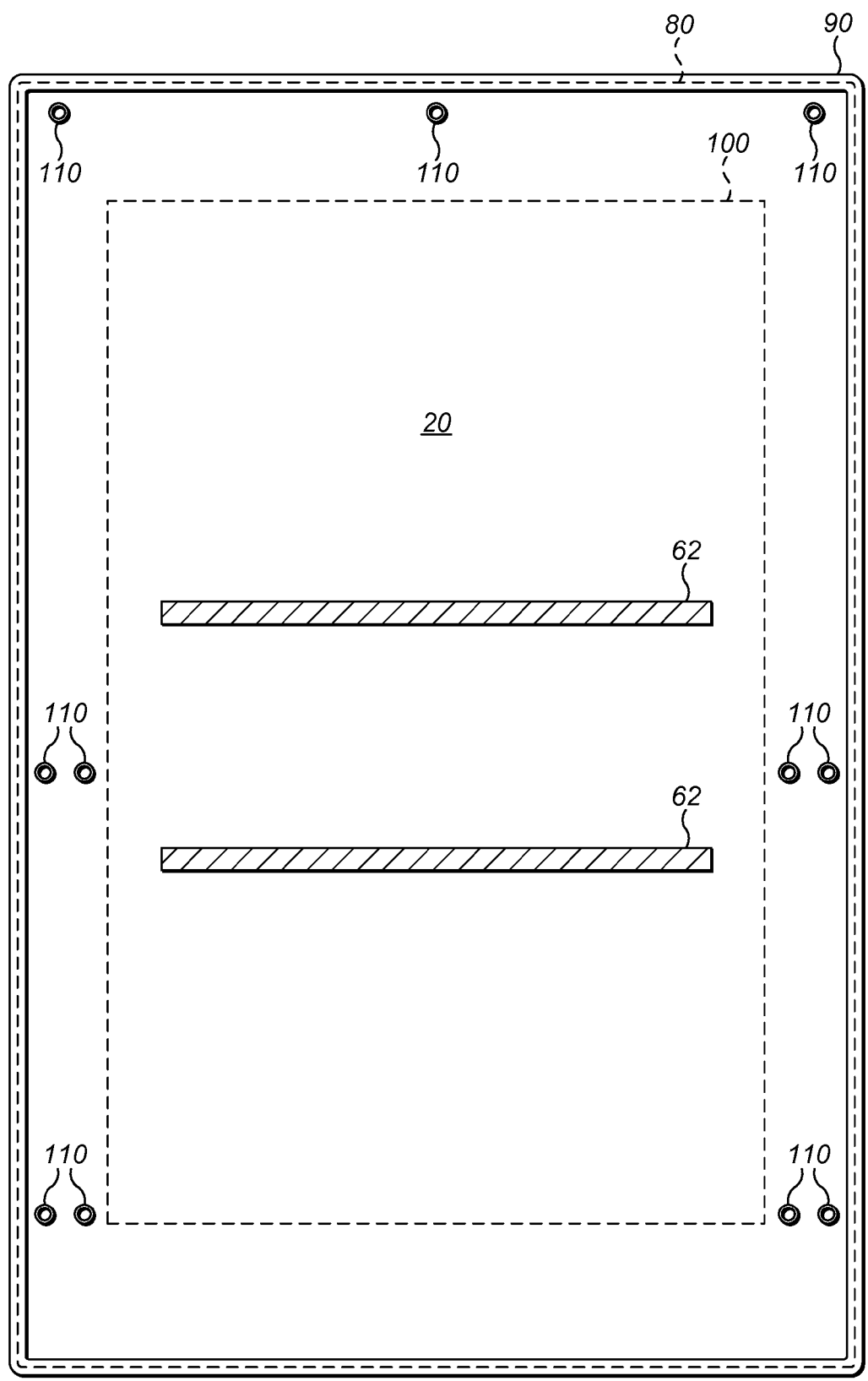
FIG. 2 is a front view of the sound absorbent barrier of FIG. 1 with the fastening means and mounting devices removed for clarity.
Figure 3:
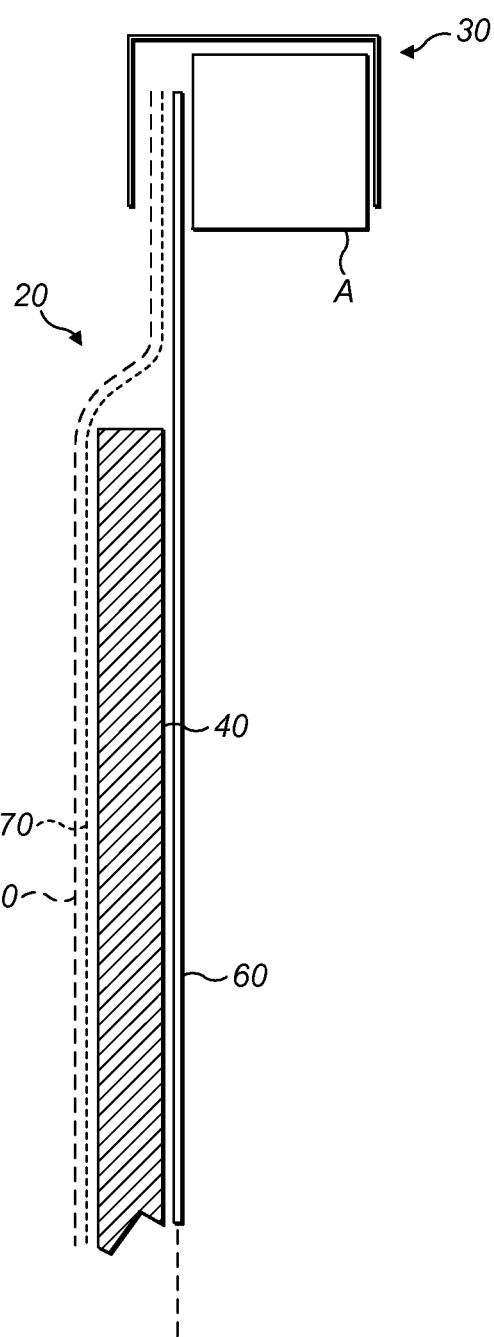
FIG. 3 is a part sectional view of the sound absorbent barrier of FIG. 1.

As shown in FIGS. 2 and 3, the screen body 20 comprises a flexible rectangular panel of sound absorbent material 40 encased between a first cover 50 and a second cover 60. The screen body 20 is typically 2,050 mm in length by 1,300 mm in width, although these dimensions can be changed to suit different applications.

In this example, the sound absorbent panel 40 is formed from an open cell polyurethane foam, such as "Lamaphon", although other types of sound absorption material, for example a closed cell foam, such as "Lamacell", or equivalent, may be used. However, an open cell foam offers the greatest sound absorption qualities.

The first cover 50 comprises a suitably durable yet lightweight and flexible plastic sheet material, and is porous, i.e. it includes a plurality of apertures such that sound waves may be more easily transmitted through the cover 50 and reducing the amount of sound which is reflected by the first cover 50. For example, it may be a woven plastic sheet with a loose, open weave to provide porosity. Thus, the first cover 50 may transmit the sound while forming a protective mesh over the sound absorbent panel 40. Preferably, the apertures of the first cover 50 do not substantially exceed 1 mm in length or width.

The second cover 60 is formed from a suitable thickness of non-porous, flexible and waterproof sheet material such that it acts as a mass barrier to prevent or reduce the transmission of sound. In this example, the second cover 60 is formed from 900 g/m$^2$ of PVC, although a variety of thicknesses or materials may be used. For weight considerations, preferably, the second cover 60 is formed from no more than 1500 g/m$^2$ of PVC.

The second cover 60 may also include one or more strips 62 of light-reflective material on its outer face, such as "Scotchlite", to increase the visibility of the barrier. The reflective strips 62 may be placed to target the headlights of a particular type of vehicle. For example, a reflective strip 62 may be placed at approximately 770 mm from the base of the barrier in order to reflect the headlights of cars, and/or at approximately 1300 mm from the base of the barrier in order to reflect the headlights of heavy goods vehicles.

The body 20 also comprises a waterproof but air-permeable and sound-permeable membrane 70 situated between the first cover 50 and the sound absorbent panel 40. The membrane 70 enables the transmission of sound waves to the sound absorbent panel 40 yet prevents water ingress. This may be of particular benefit if the sound absorbent panel 40 is hydrophilic since water absorption may lessen the effectiveness of the panel 40 as a sound absorber and cause the barrier 10 to become very heavy and difficult to handle. The membrane 70 is formed from a suitable thickness of waterproof air and sound-permeable textile material. In this example, the membrane 70 is formed from between approximately 10 g/m$^2$ and 100 g/m$^2$ of Gore-Tex® or equivalent material.

The first cover 50, second cover 60 and membrane 70 are overlaid and stitched together using thread 80. A webbing 90 may also be positioned around the edges of the body 20 to further strengthen the barrier 10. A second row of thread 100 may be stitched through the covers 50, 60 and the membrane 70 to keep the panel 40 in a specific location, such as aligned in the centre of the screen body 20, as shown in FIG. 2.

The barrier 10 includes a number of eyelets 110 around the periphery of the screen 20. These eyelets allow the barrier 10 to be fixed to fencing, scaffolding or other supporting structures, or to adjacent barriers 10. The barrier 10 may be fixed by hooks, cable ties, or other fixing mechanisms. Preferably, the barrier 10 is fixed using mounting devices 30, as discussed below. Typically, the eyelets are 25 mm in diameter. This size is sufficiently large to aid the fixing of the barrier 10 to the supporting structure, or to enable adjacent barriers 10 to be more easily aligned and fixed together. The barrier 10 may have one or more rows of at least two eyelets 110 to enable the relative position and overlap of adjacent barriers 10 to be adjusted.

Figure 4:
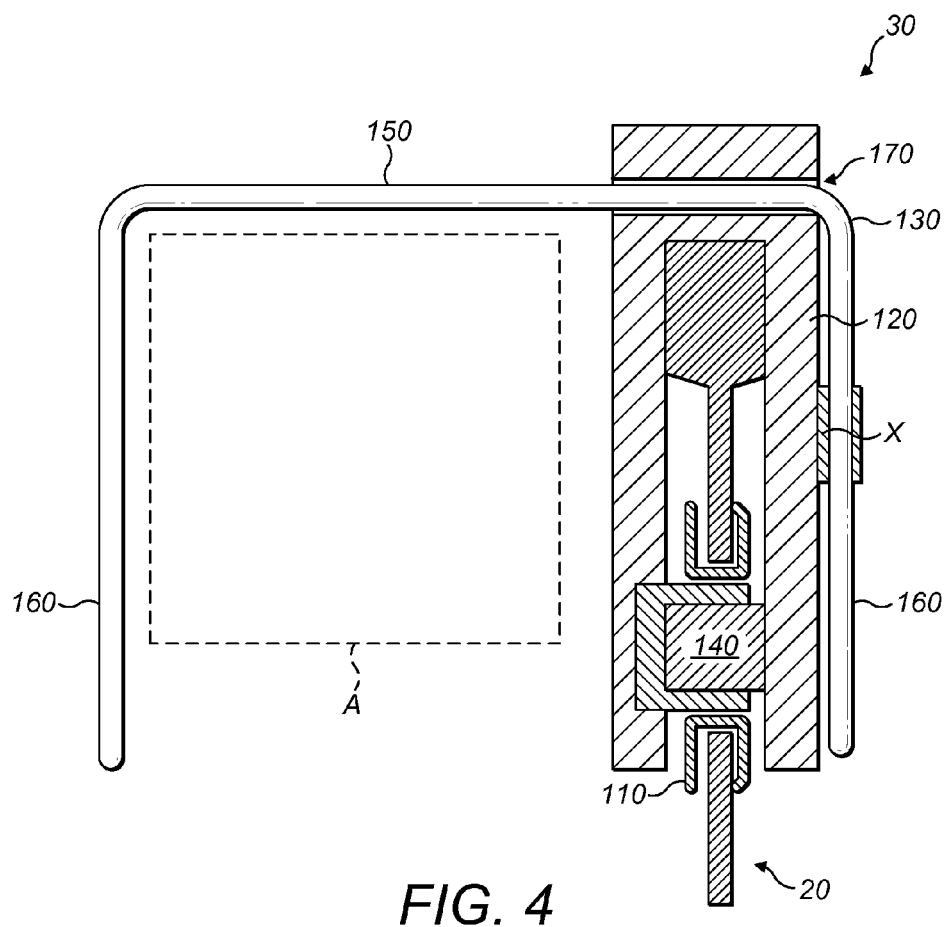
FIG. 4 is a sectional view of the mounting device of the sound absorbent barrier of FIG. 1.
Figure 5:
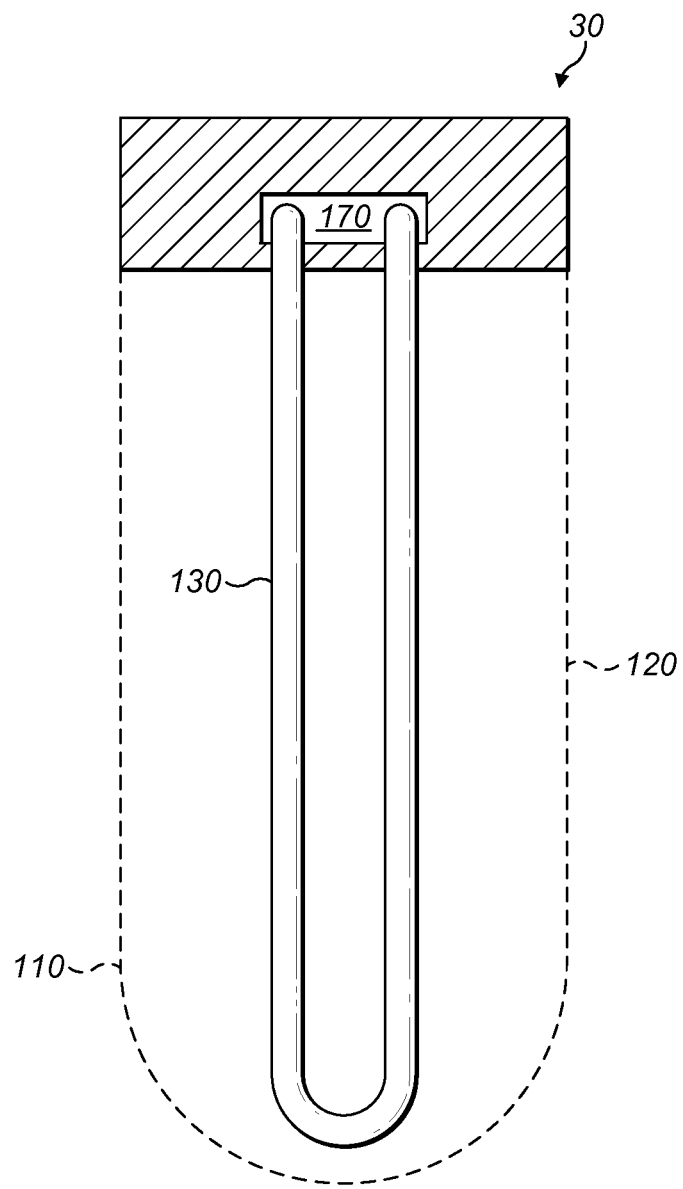
FIG. 5 is a front view of the mounting device of FIG. 4, with the majority of the carrier of the mounting device removed for clarity.

FIGS. 4 and 5 show a mounting device 30 connected to the screen body 20. The mounting device 30 comprises a carrier 120 and a hook member 130. The carrier 120 may be formed from a plastic, or other suitable material, such as a composite material or steel and has a substantially U-shaped cross section to fit over the top edge of the barrier 10. The carrier 120 may be fixed to the body 20 via a fixing means 140 which is connected to the carrier 120 and may pass through one of the eyelets 110 of the barrier 10. The fixing means 140 may comprise a clip or a nut and bolt arrangement, for example. With this arrangement, the mounting device 30 can be easily fixed to or removed from the screen body 20 as required.

The hook member 130 is formed from a suitable thickness of deformable material, such as steel, plastic, or composite material, such that the hook member 130 will deform if trodden on or driven over, rather than breaking or snapping. Further, the flexibility of the barrier 10 allows the mounting device 30 to move, thus reducing the likelihood of damage to the mounting device 30. This prevents the mounting device 30 from presenting a sharp edge by which a worker may be injured, or equipment may be damaged and prevents damage to the barrier 10 itself. The hook member 130 includes a top section 150 and at least one side arm section 160 projecting downwards from the top section 150.

Figure 6:
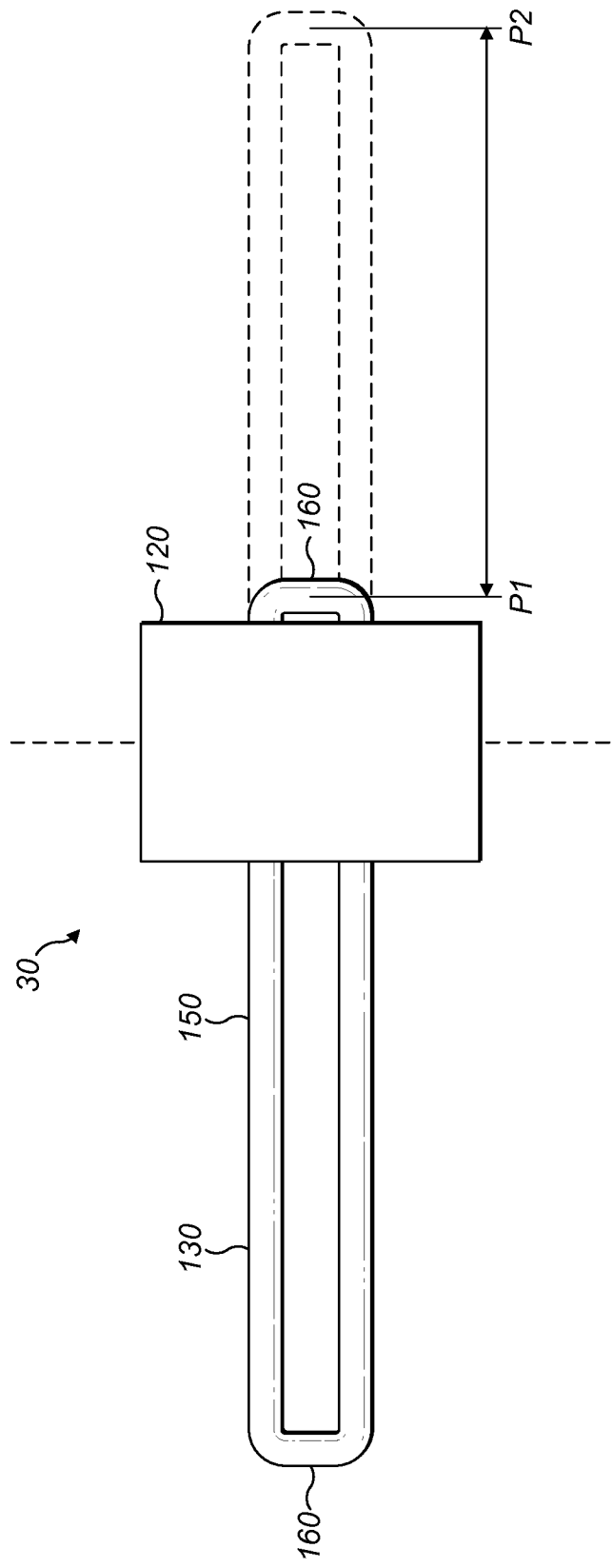
FIG. 6 is a top view of the mounting device of FIG. 4.

The top section 150 of the hook member 130 is supported within an aperture 170 of the carrier 120 such that the hook member 130 is slidable relative to the carrier 120 in a direction substantially perpendicular to the plane of the screen 20. With this arrangement, the distance between the side arm section 160 of the hook member 130 and the carrier 120 may be varied to accommodate various sizes of supporting structure. The relative movement of the carrier 120 and the hook member 130 is illustrated in FIG. 6, which shows the hook member in a first position P1 and a second position P2.

As an alternative to the single-sided hook arrangement, the hook member 130 may be double-sided, i.e. it may have two side arm sections 160, as shown in FIG. 4. This allows the barrier 10 to be installed on either side of the supporting structure A.

The carrier 120 and the hook member 130 may be fitted with a detent means (not shown) to resist the sliding displacement of the hook member and/or divide the displacement of the hook member 130 into discrete increments. This will enable the mounting device 30 to clamp the supporting structure A thus fixing the barrier 10 more securely.

Figure 7:
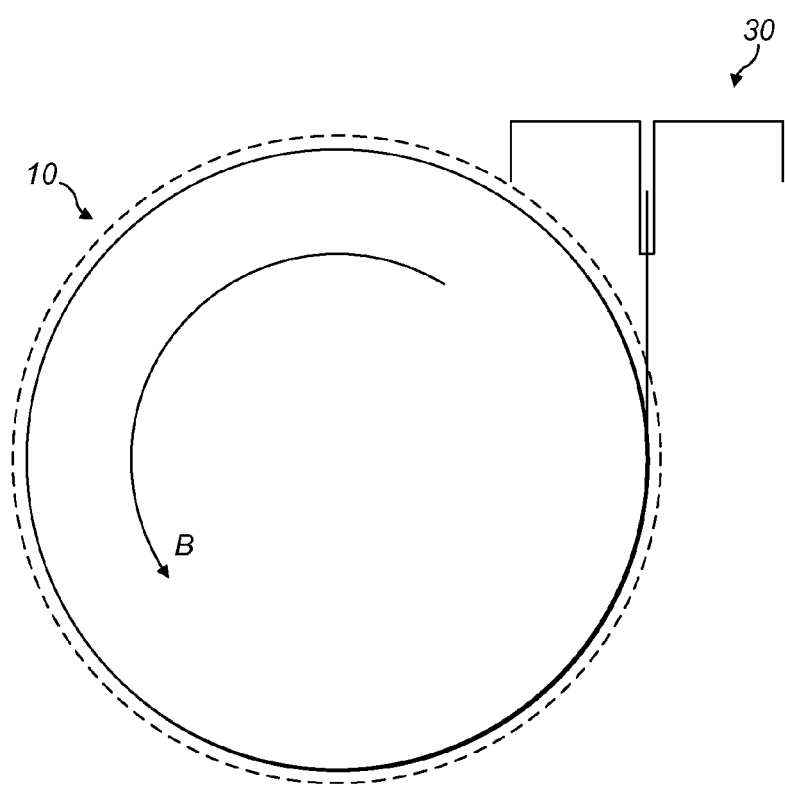
FIG. 7 is a side view of the sound absorbent barrier of FIG. 1, showing the sound absorbent barrier in a rolled-up state.
Figure 8:
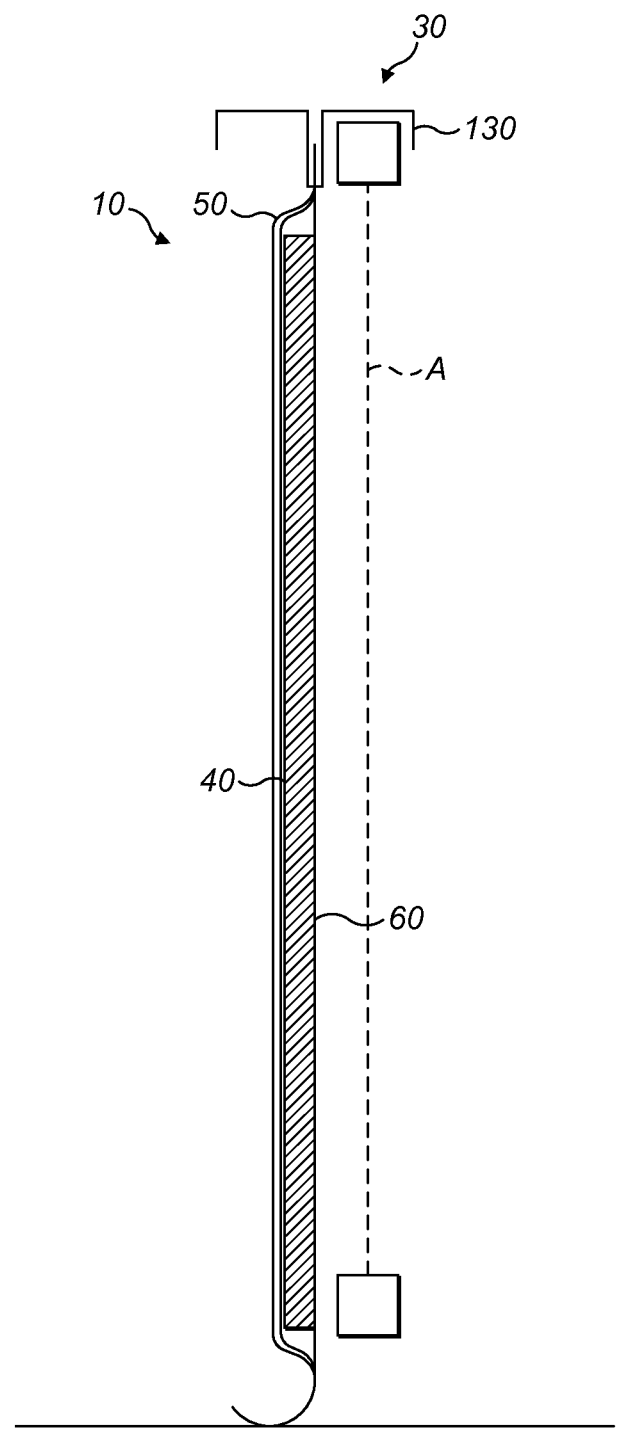
FIG. 8 is a side view of the sound absorbent barrier of FIG. 1, showing the sound absorbent barrier hanging from a supporting structure.

With reference to FIGS. 7 and 8, a method of installing the barrier 10 will be described.

The barrier 10 is held by a user and carried to the desired location whilst in a rolled-up state, as shown in FIG. 7. The hook member 130 of each mounting device 30 of the barrier 10 is placed over the supporting structure A. If the barrier 10 is to be hung inside the structure A, for example inside the boundary fence of a construction site, the hook members 130 of the mounting devices 30 should be located (in the case of a single-sided hook arrangement) or extended (in the case of a double-sided hook arrangement) on the side of the barrier 10 corresponding to the second cover 60. Conversely, if the barrier 10 is to be hung outside the supporting structure A, for example on the external side of scaffolding, the hook members 130 should be located or extended on the side of the barrier 10 corresponding to the first cover 50. This ensures that the first cover 50 faces the source of the noise.

Once positioned over the supporting structure A, each hook member 130 can then be adjusted such that it clamps the supporting structure A. The fastening means 32 is then released such that the barrier 10 unfurls in direction B under its own weight to the position shown in FIG. 8.

Similarly, further barriers 10 can be installed on the supporting structure A such that adjacent barriers 10 overlap to provide a continuous layer of noise protection. Adjacent barriers can be fixed to one another either by aligning the eyelets 110 and employing a fastening device such as a cable tie through the eyelets 110, or by other means such as Velcro or a zip.

Once the barrier 10 is installed at the desired location with the first cover 50 facing the noise source, sound waves pass through the receptor mesh of the first cover 50 and are absorbed by the sound absorbent panel 40 which dissipates a proportion of the energy of the incident sound waves as heat. A proportion of the remaining sound waves are reflected by the second cover 60 back into the sound absorbent panel, thus enhancing the noise absorption.

If greater noise attenuation is required, for instance in close proximity to a particularly loud source of noise, multiple layers of barriers 10 can be hung from the supporting structure A. In order to do so, the hook members 130 of a second, or further, barrier 10 may be extended to a greater degree than those of the first barrier 10 so that they may also fit over the supporting structure A. Alternatively, if a double-sided hook arrangement is employed, further barriers may be installed on the reverse side of the fence or scaffolding.

Figure 9:
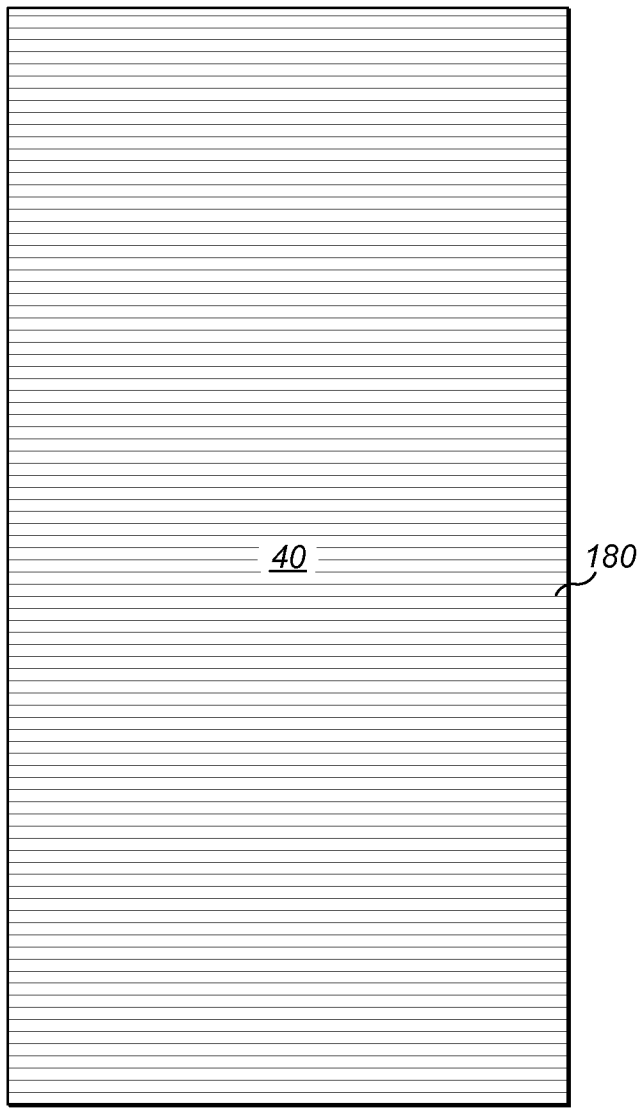
FIG. 9 is a front view of a sound absorbent layer having a ridged profile.
Figure 10:
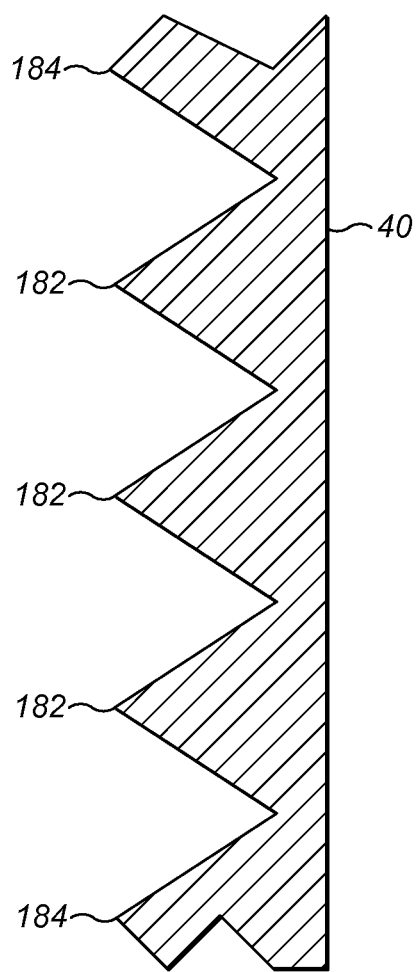
FIG. 10 is a part sectional view of the sound absorbent layer of FIG. 9.

With reference to FIGS. 9 and 10, an alternative sound absorbent layer 40 is shown. Rather than presenting a flat surface to the noise source, the sound absorbent layer 40 may have a profiled surface. For example, the sound absorbent layer 40 may have a plurality of ridges 180 or protrusions extending across the width of the panel 40 in order to increase the surface area of the sound absorber 40 and to change the absorbing characteristics. Such ridges 180 also facilitate the easy rolling of the barrier 10. The ridges 180 may have a regular profile, as shown by the ridges 182 along the middle of FIG. 10, or an irregular profile, for example being formed as a plurality of egg box-shaped protrusions, or as shown by the ridges 184 at the top and bottom of FIG. 10.

Figure 11:
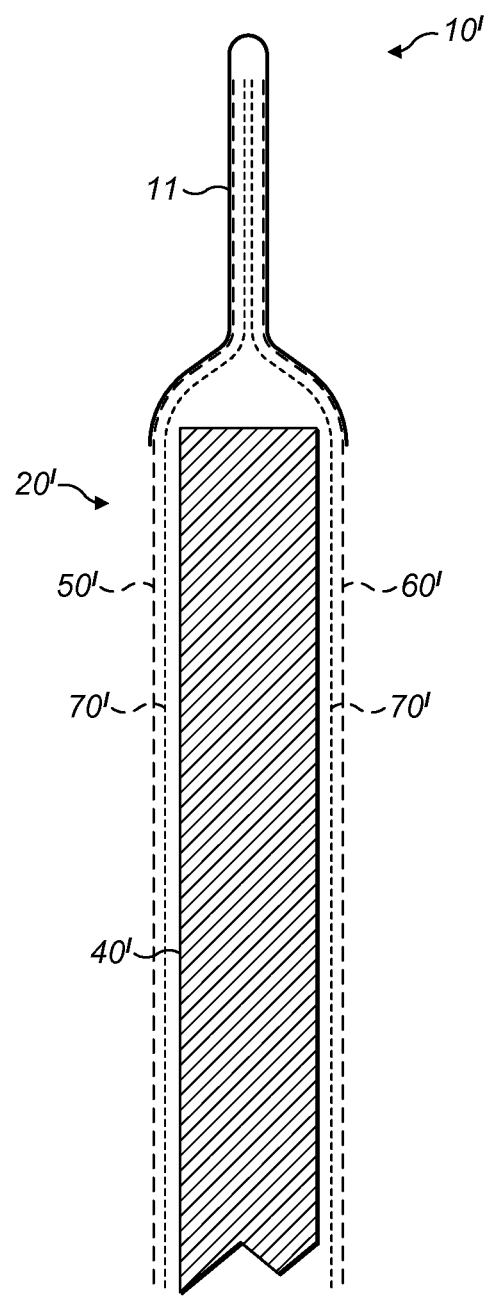
FIG. 11 is a part sectional view of an alternative sound absorbent barrier in accordance with a second embodiment of the invention.

FIG. 11 shows a second embodiment of sound barrier 10'. As with previously described barrier 10, the screen body 20' of the sound barrier 10' comprises a flexible panel of sound absorbent material 40' encased between a first cover 50' and a second cover 60'.

In this configuration, both the first cover 50' and the second cover 60' comprise a suitably durable yet lightweight and flexible plastic sheet material which is porous, i.e. it includes a plurality of apertures. A waterproof but air-permeable and sound-permeable membrane 70' is situated on each side of the sound absorbent panel 40'. Thus, the first and second covers 50' and 60' form a sound-permeable protective mesh over the sound absorbent panel 40' and the membranes 70', while the membranes 70' prevent water ingress. This configuration enables both faces of the sound barrier 10' to absorb sound effectively.

The barrier 10' may also include an impermeable edging strip 11 along the top or other edges of the barrier to provide added weatherproofing and a surface for printing.

Figure 12:
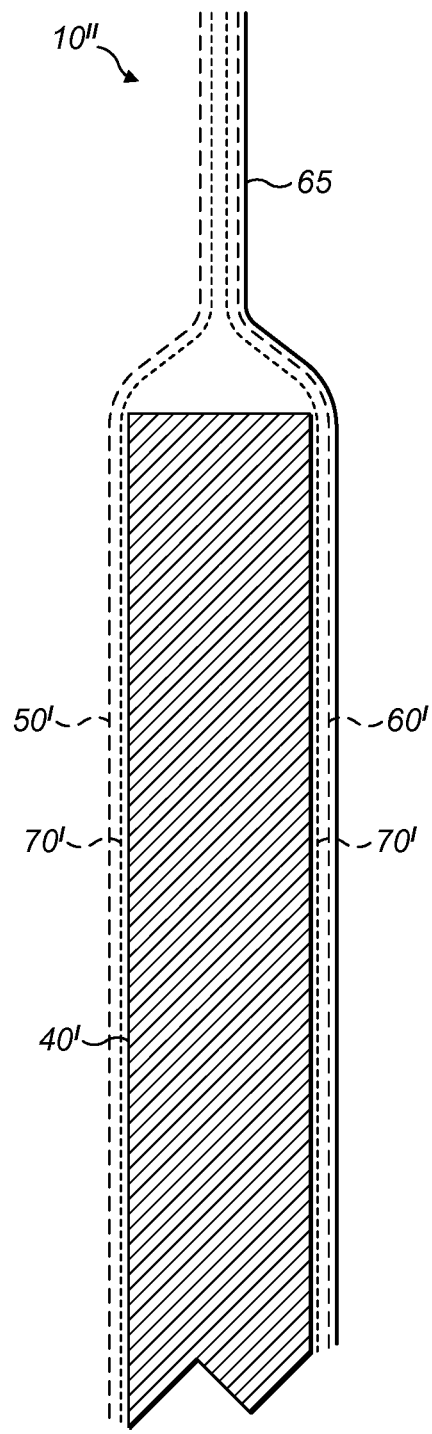
FIG. 12 is a part sectional view of an alternative sound absorbent barrier in accordance with a third embodiment of the invention.
Figure 13:
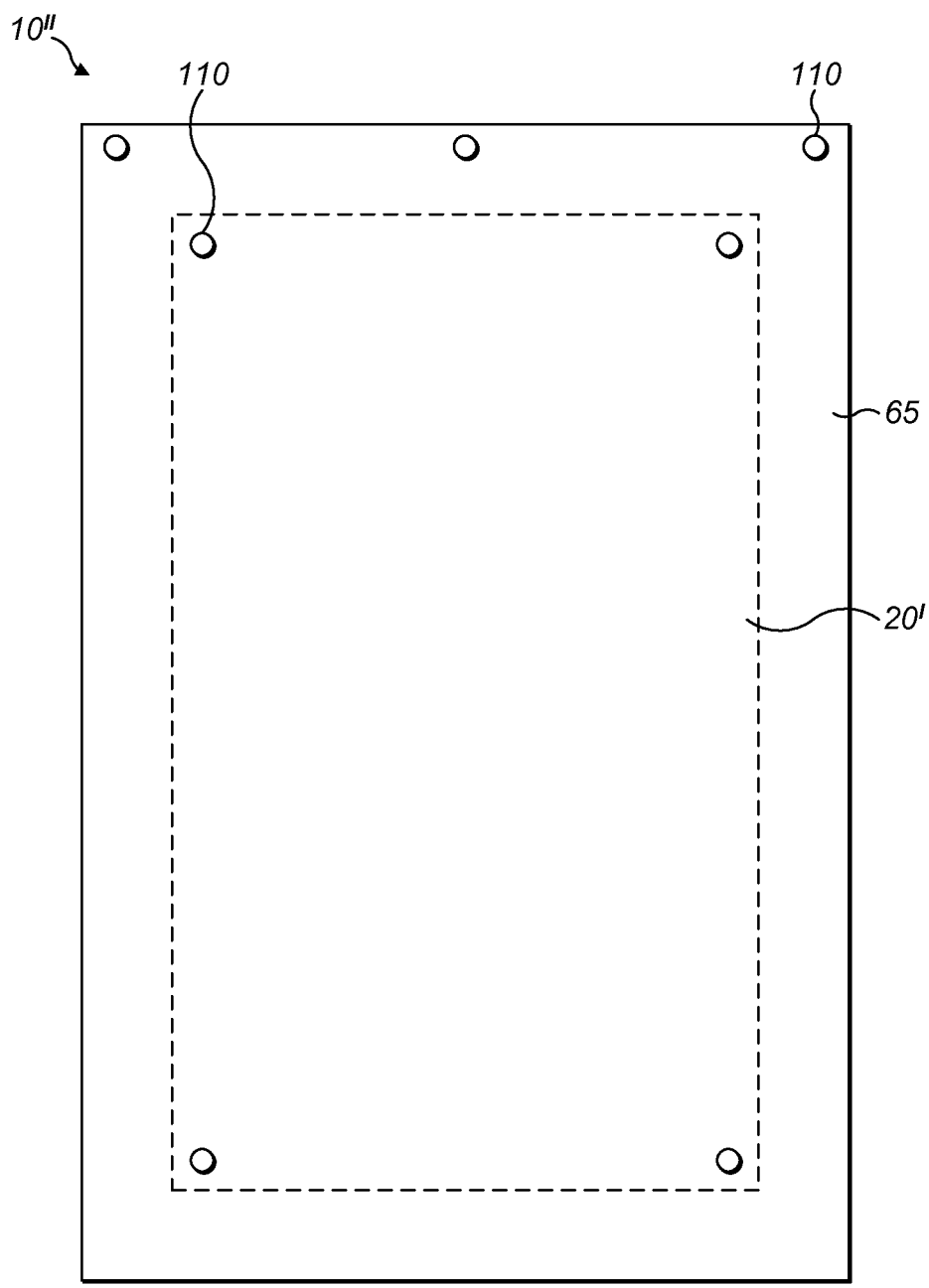
FIG. 13 is a front view of the sound absorbent barrier of FIG. 12.

FIGS. 12 and 13 show a third embodiment of sound barrier 10". In this example, the screen body 20' shown in FIG. 11 may be attached to a flexible, waterproof non-porous layer 65, for example a PVC layer, which is hung from a supporting structure (not shown) using eyelets 110. The non-porous layer 65 acts as a mass layer, i.e. it restricts the transmission of sound through the barrier 10". With the addition of the non-porous layer mass layer 65, sound which has passed through the screen 20' is reflected back through the screen 20' by the non-porous layer 65. Thus, the arrangement may provide improved sound absorption in addition to reduced sound transmission. The non-porous layer 65 and the screen may be coextensive with the screen 20' and both hung from the supporting structure using, as shown in FIG. 12. Alternatively, as shown in FIG. 13, the non-porous layer may be hung from a supporting structure and the screen 20' attached to the non-porous layer 65 using known techniques, such as Velcro®, ties, poppers, and/or clips (not shown). With the latter arrangement, the non-porous layer 65 can be sized to fit the requirements of a given installation.

It will be appreciated that the mounting device 30 with hooks 130, and the fastening means 32 for securing the barriers 10 in a rolled up state are features which could be applied (together or separately) to different types of barriers, such as sound absorbing barriers which do not include a waterproof sound permeable layer, or barriers used for other purposes such as visual screening.

Figure 14:
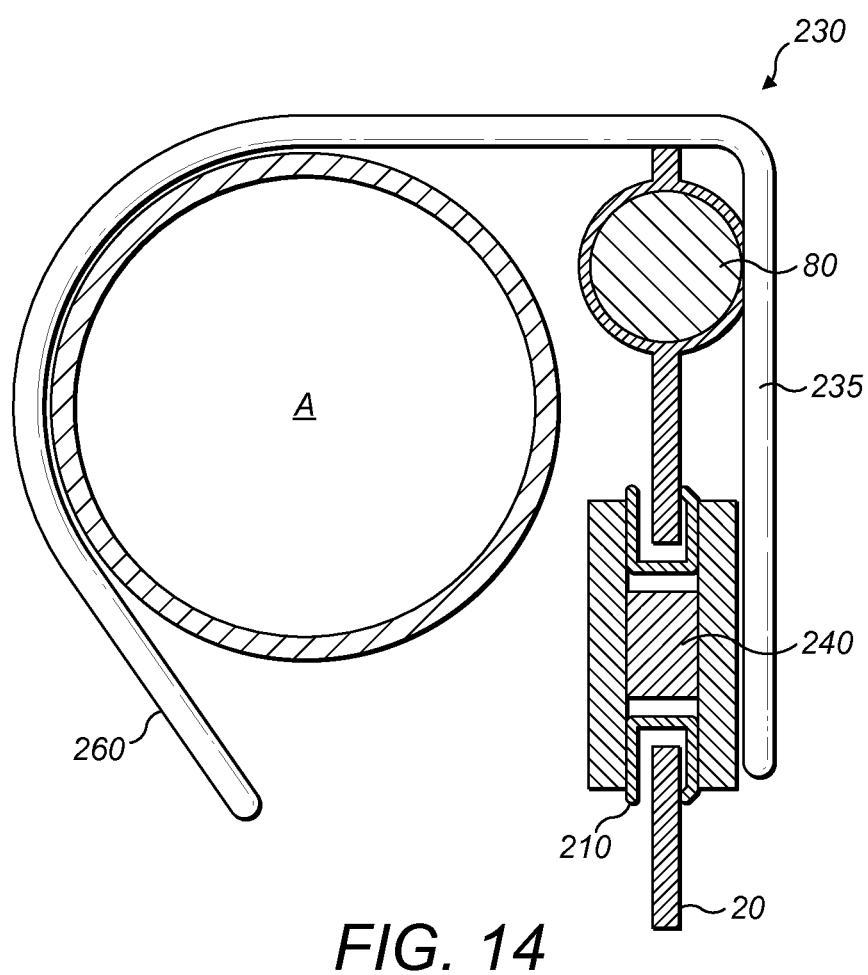
FIG. 14 is a sectional view of an alternative mounting device of the sound absorbent barrier of FIG. 1.

FIG. 14 shows an alternative configuration of mounting device 230 connected to the screen body 20. The mounting device 230 is substantially the same as mounting device 130. However, instead of fixing the hook member by means of a carrier, the fixing means 240 of the mounting device 230 secures the hook member 235 directly to the eyelet 210 of the barrier 10. Alternatively, the fixing means fixes the hook member 235 to a hole through the barrier 10, if no eyelet is provided. In either case, the hook member 235 is not slidable relative to the barrier, as in the first embodiment, but is slidably fixed relative to the barrier.

As shown in FIG. 14, one of the side arm sections 260 may be bent, fabricated, or moulded such that it is angled back towards the barrier 10 to suspend the barrier 10 more securely.

Figure 15:
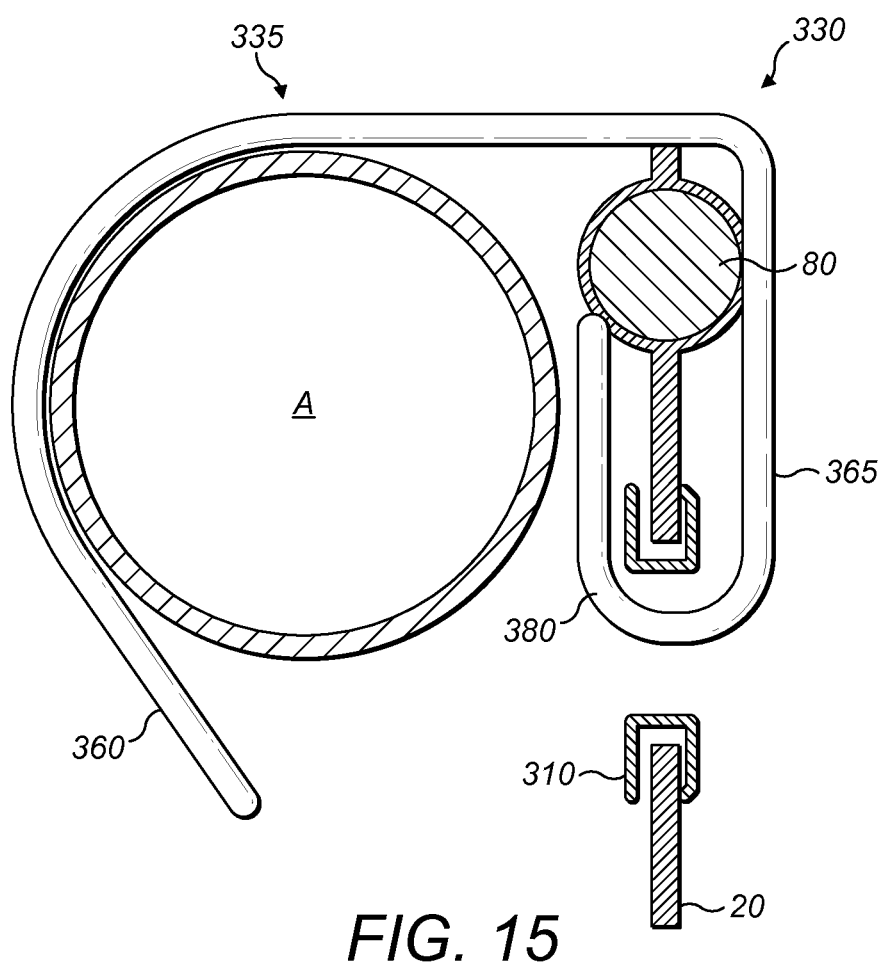
FIG. 15 is a sectional view of a further alternative mounting device for the sound absorbent barrier of FIG. 1.

FIG. 15 shows a further alternative configuration of mounting device 330. The mounting device 330 comprises a hook member 335, which includes a rounded, first side arm section 360 for placing over the top of a supporting structure A and a second side arm section 365, at the end of which is a barrier hook section 380 facing inwardly, i.e. toward the first side arm section 360. The hook section 380 is passed through the eyelet 310 of the barrier 10, or simply through a hole in the barrier 10, to suspend the barrier 10 from the mounting device 330.

Figure 16:
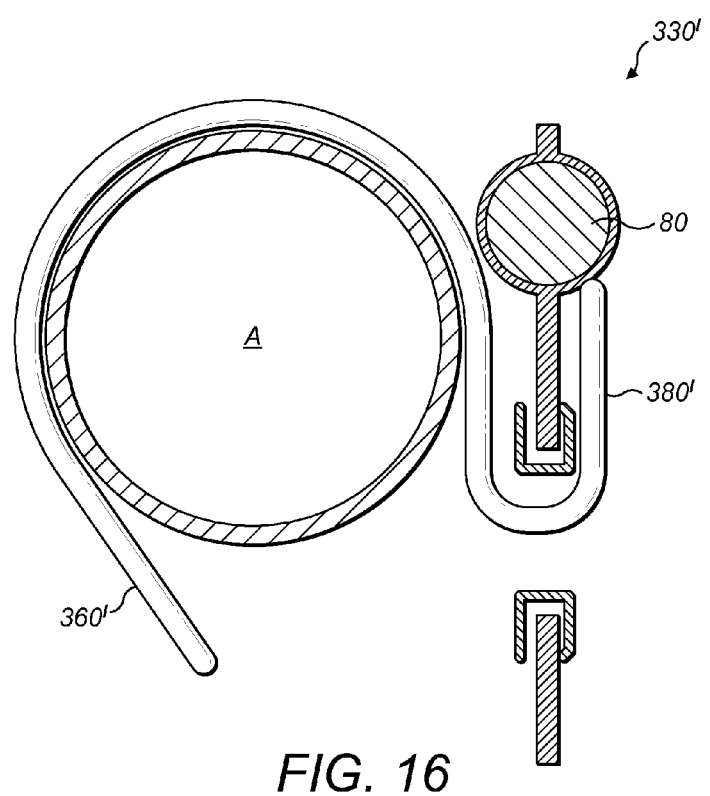
FIG. 16 is a sectional view of a further alternative mounting device for the sound absorbent barrier of FIG. 1.

Alternatively, as shown in FIG. 16, the barrier hook section 380' of the mounting device 330' may be configured to face outwardly, i.e. away from the first side arm section 360'. With this configuration, the barrier 10 may be easily placed over, or removed from, the barrier hook section 380' while the mounting device 330' remains in place over the supporting structure A.

Figure 18:
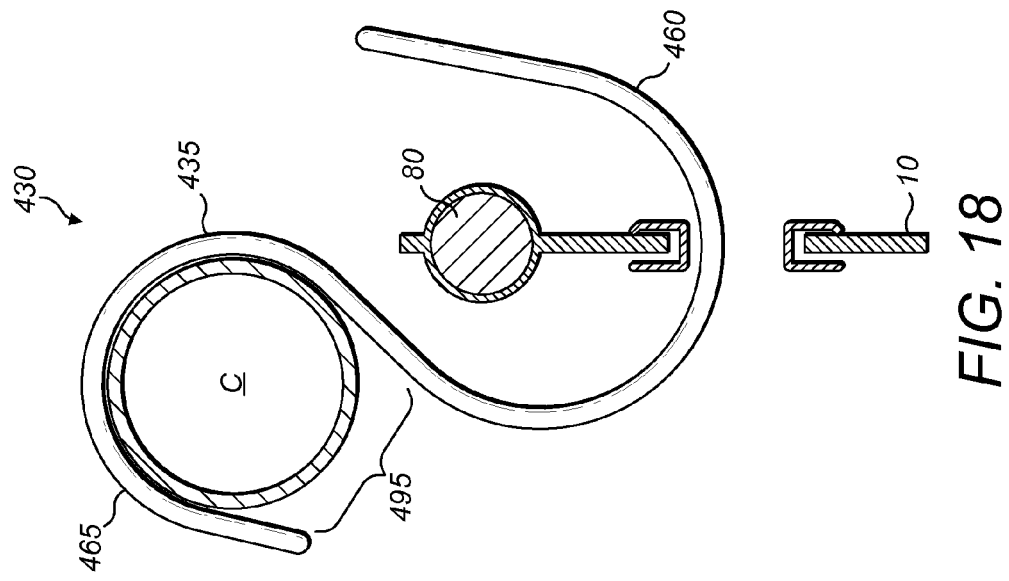
FIG. 18 is a sectional view of the mounting device of FIG. 15 in a second configuration.
Figure 17:
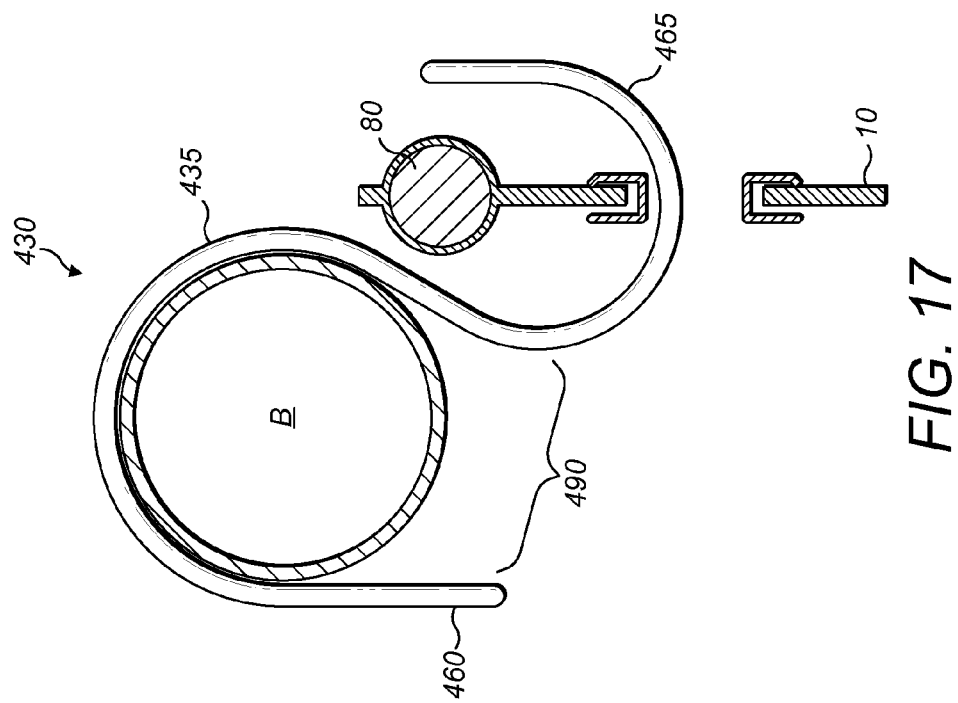
FIG. 17 is a sectional view of a further alternative mounting device of the sound absorbent barrier of FIG. 1, showing the mounting device in a first configuration.

FIGS. 17 and 18 show a further configuration of mounting device 430. The mounting device 430 comprises a resilient and substantially S-shaped hook member 435 having first and second hook sections 460, 465. The dimensions of the first and second hook sections 460, 465 may be different and selected such that they clip over different diameter fence tubes B and C. For example, in the UK construction industry the fence tubes typically used are approximately 40 mm and 35 mm in diameter, respectively. Thus, if first hook section 460 has a diameter of slightly less than 40 mm and the second hook section 465 has a diameter of slightly less than 35 mm, the slightly resilient hook member 435 will be held in tension and will grip to the fence post B or C.

The open ends 490, 495 of each hook section 460, 465 may be narrower than the diameter of the respective tube B or C, as shown in FIGS. 17 and 18, to provide a more secure clipping of the hook member 435 to the fence tube B or C.

In use, one or more hook members 435 are clipped over a fence tube B or C, using either first or second hook section 460, 465. The selection of first or second hook section 460, 465 will depend on the diameter of fence tube from which the barrier 10 is to be suspended. The screen 20 is then hooked over the hook section which is not clipped over the fence tube. By way of example, FIG. 15 shows the first hook section 460 clipped over fence tube B and the screen 20 hung from the second hook section 465.

Thus, the present invention provides a sound absorbent barrier that is highly flexible and waterproof without compromising the acoustic absorption properties of the absorbent material. The flexibility allows the barrier to be conformed to suit the supporting structure, typically fencing or scaffolding, and to be rolled or folded for transport or storage.

The invention claimed is:

1. A flexible sound absorbent barrier comprising:
a flexible sound absorbent layer disposed between a flexible first porous sound-permeable cover and a flexible second cover; and
a flexible air-permeable and waterproof sound-permeable sheet textile disposed between the first cover and the sound absorbent layer,
wherein the sound absorbent barrier is sufficiently flexible for it to be rolled-up.

2. A flexible sound absorbent barrier according to claim 1, wherein a second waterproof sound-permeable textile membrane is disposed between the second cover and the sound absorbent layer.

3. A flexible sound absorbent barrier as claimed in claim 1, wherein the sound absorbent barrier further comprises fastening means to retain the sound absorbent barrier in a rolled-up state.

4. A sound absorbent barrier as claimed in claim 1, wherein the first cover is formed from a flexible plastic material.

5. A sound absorbent barrier as claimed in claim 1, wherein the waterproof sound-permeable membrane is formed from Gore-Tex or equivalent material.

6. A flexible sound absorbent barrier according to claim 1, wherein the second cover is porous and sound-permeable.

7. A flexible sound absorbent barrier according to claim 6, wherein a flexible, non-porous third cover is provided adjacent to the second cover.

8. A flexible sound absorbent barrier according to claim 7, wherein the third cover is formed from PVC.

9. A flexible sound absorbent barrier according to claim 1, wherein the second cover is non-porous.

10. A flexible sound absorbent barrier as claimed in claim 9, wherein the second cover is formed from PVC.

11. A flexible sound absorbent barrier as claimed in claim 1, wherein the sound absorbent layer comprises an open cell foam.

12. A flexible sound absorbent barrier as claimed in claim 11, wherein the sound absorbent layer comprises a profiled surface including a plurality of ridges or protrusions.

13. A flexible sound absorbent barrier as claimed in claim 1, wherein the sound absorbent barrier further comprises a mounting device for hanging the sound absorbent barrier from a supporting structure.

14. A flexible sound absorbent barrier as claimed in claim 13, wherein the mounting device comprises a hook member.

15. A flexible sound absorbent barrier as claimed in claim 14, wherein the mounting device further comprises a carrier to which the hook member is slidably connected such that the hook member is slidable relative to the sound absorbent barrier in a direction substantially perpendicular to a plane of the sound absorbent barrier.

16. A flexible sound absorbent barrier as claimed in claim 15, wherein the mounting device comprises a detent means to resist sliding of the hook member.

17. A flexible sound absorbent barrier as claimed in claim 15, wherein the mounting device comprises a detent means to divide the sliding displacement of the hook member into discrete increments.

18. A flexible sound absorbent barrier according to claim 14, wherein the hook member comprises a first hook for hanging the barrier from a supporting structure and a second hook for hanging the barrier from the hook member.

19. A flexible sound absorbent barrier according to claim 18, wherein the first and second hook members are different sizes.

* * * * *